United States Patent [19]

Yew et al.

[11] Patent Number: 5,450,943
[45] Date of Patent: Sep. 19, 1995

[54] APPARATUS FOR HANDLING ELONGATE ARTICLES

[75] Inventors: David K. Yew, Great Sutton; Kevin J. Davies, Warrington, both of England

[73] Assignee: British Nuclear Fuels plc, Cheshire, England

[21] Appl. No.: 46,972

[22] Filed: Apr. 15, 1993

Related U.S. Application Data

[63] Continuation of Ser. No. 311,061, Feb. 16, 1989, abandoned.

[30] Foreign Application Priority Data

Feb. 26, 1988 [GB] United Kingdom ................ 8804499

[51] Int. Cl.⁶ .............................................. B65G 37/00
[52] U.S. Cl. .................. 198/468.6; 198/614; 414/745.9
[58] Field of Search ............ 198/468.6, 468.01, 468.9, 198/468.11, 456, 738, 746, 614; 414/746.4, 745.9

[56] References Cited

U.S. PATENT DOCUMENTS

| | | | |
|---|---|---|---|
| 2,623,570 | 12/1952 | Resser | 414/746.7 X |
| 2,728,327 | 12/1955 | Benninghoff et al. | 198/468.6 X |
| 2,925,166 | 2/1960 | Sawdey | 414/746.6 X |
| 4,234,288 | 11/1980 | Hartkopf | 414/746.2 |
| 4,593,807 | 6/1986 | Lattaneo et al. | 414/746.2 X |
| 4,858,114 | 4/1986 | Liliano | 198/614 X |

FOREIGN PATENT DOCUMENTS

| | | | |
|---|---|---|---|
| 2260146 | 6/1974 | Germany | 198/744 |
| 0598814 | 3/1978 | U.S.S.R. | 198/468.7 |

*Primary Examiner*—James R. Bidwell
*Attorney, Agent, or Firm*—William R. Hinds

[57] ABSTRACT

Apparatus for moving axially elongate articles, such as nuclear fuel pins, between work stations and comprising aligned rollers forming at least two substantially parallel paths tranversely spaced apart. Drive devices are provided for axially moving the articles along the paths and displacement devices are provided for moving the fuel pins transversely between the paths.

8 Claims, 3 Drawing Sheets

APPARATUS FOR HANDLING ELONGATE ARTICLES

This is a continuation of application Ser. No. 07/311,061 filed Feb. 16, 1989, now abandoned.

The present invention concerns an apparatus for handling axially elongate articles. In particular the invention concerns apparatus for handling elongate nuclear fuel pins movable along axial paths through a plurality of work stations.

FEATURES AND ASPECTS OF THE INVENTION

According to the present invention apparatus for handling axially elongate articles comprises aligned rollers forming at least two substantially parallel, transversely spaced apart axial travel paths for the articles, drive means for axially moving the articles along the paths and displacement means for moving the articles transversely between the paths.

In an apparatus having two travel paths, the first path can constitute an entry and a work station position and the second path can constitute an exit position. Alternatively a third path can be provided to constitute a separate work station position disposed parallel to and intermediate the first and second paths.

DESCRIPTION OF THE DRAWINGS

The invention will be described further, by way of example, with reference to the accompanying drawings, in which.

DESCRIPTION OF THE PREFERRED EMBODIMENTS

The apparatus can be used to handle elongate nuclear fuel pins and the apparatus can comprise an in-line arrangement of work stations and pin handling stations, the pins being advanced lengthwise by pinch-wheel drive mechanisms arranged at intervals, not greater than the length of a pin, along the length of the apparatus. A suitable drive mechanism comprises a grooved idler roller to support a pin and a co-operating driven roller urged into contact with the pin to thereby drive the pin in an axial direction. A plurality of such drive mechanisms can be spaced at intervals along each path of travel of the fuel pins.

Figure 1:
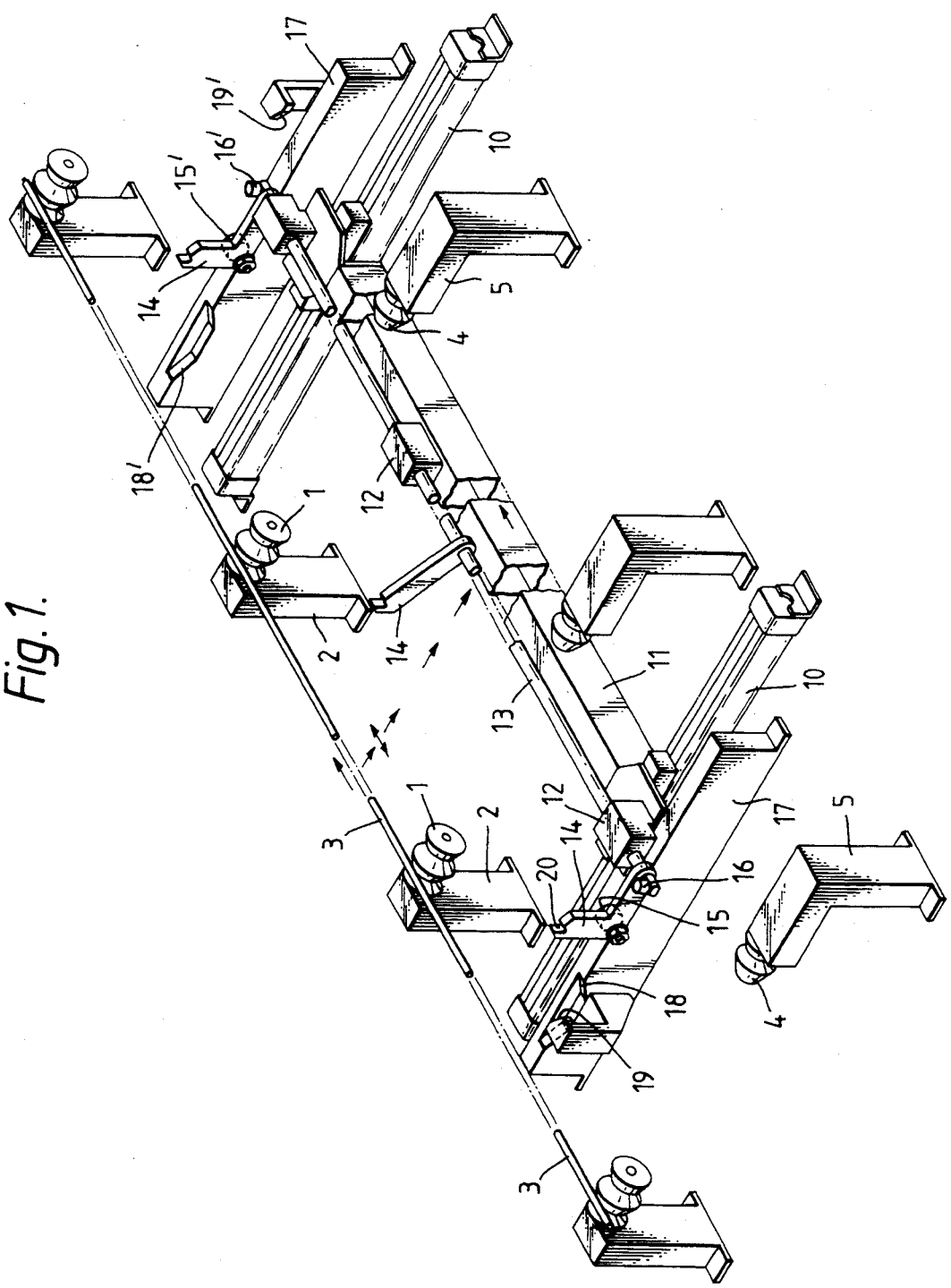
FIG. 1 is an isometric view of a portion of an apparatus for handling axially elongate articles.

With reference to FIG. 1, aligned profiled rollers 1 rotatably mounted on supports 2 define two axial travel paths for elongate members 3, such as nuclear fuel pins. Further aligned profiled rollers 4 rotatably journalled on supports 5 define a further travel path. Each profiled roller 1, as best seen from FIG. 2(a)-(f), has a pair of grooves 6 and 7 which are in alignment and define the first two mentioned travel paths. The profiled rollers 4 have a single groove 8 which define the further travel path. Thus, the aligned grooves 6 can define an entry position, the grooves 7 a work station position and the grooves 8 an exit position. The pins can be propelled axially at each position by drive mechanisms as mentioned above.

The pins 3 are moved transversely between the positions determined by the aligned grooves in the profiled rollers. Thus pin 3 at the entry position is transferred to the work station position at which the pin is advanced axially into a work station (not shown). Whilst operations are being performed on the pin at the work station a further pin 3 can be introduced at the entry position. Upon completion of operation at the work station the pin is withdrawn from the work station and transferred to the exit position for dispatch to a further station. The work station is then ready to receive the further pin 3 previously introduced at the entry position.

Transverse pin movements between the entry, work and exit positions can be performed by a mechanism which comprises a pair of rodless pneumatic cylinders 10 arranged parallel and connected by a cross-beam 11. The cross-beam carries bearing blocks 12 for a shaft 13 capable of both axial and rotational movement. Fingers 14 to support and transport fuel pins 3 are secured at spaced apart intervals to the shaft 13. The fingers 14 at the ends of the shaft 13 are provided with cam followers in the form of rollers. Each end finger 14 has two cam followers, namely a first roller 15 or $15^1$ rotatable about a substantially horizontal axis and a second roller 16 or $16^1$ rotatable about a substantially vertical axis. The rollers 15, $15^1$ are arranged to run on the upper surfaces of guides 17 and located parallel and adjacent to the rodless pneumatic cylinders 10. The roller 15, $15^1$ cooperate with cam profiles 18, $18^1$ in the guides 17. Likewise, the rollers 16, $16^1$ are arranged to cooperate with cams 19, $19^1$ to effect axial displacement of the shaft 13.

Figure 2A:
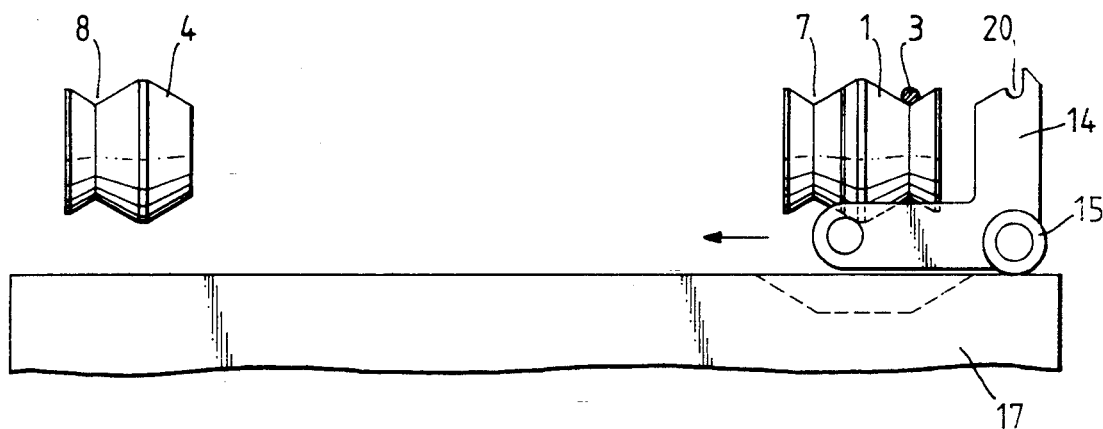
FIGS. 2A to 2F show a sequence of handling movements.
Figure 2B:
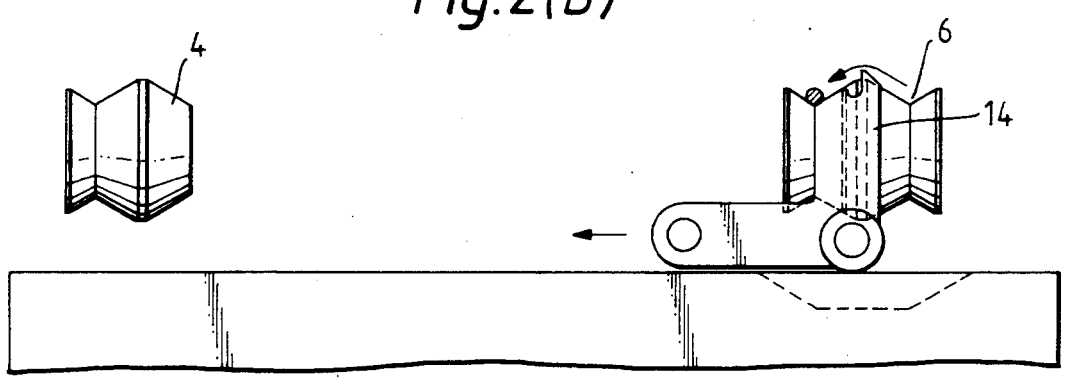

The sequence of movement of the fingers 14 for the transfer of fuel pins between the pin entry, work and pin exit positions can be seen from FIGS. 2a to 2f. Initially, the fingers 14 are located behind the pin 3 at the entry position 6 as in FIG. 2a. The cylinders 10 are actuated to advance the cross-beam 11 and hence the fingers 14. The fingers 14 contact the pin and continued operation of the cylinders 10 causes the fingers to push the pin 3 out of the entry position 6 and to drop into the work position 7 as shown in FIG. 2b. The cylinders 10 are de-energised and the pin 3 is moved axially into a work station to allow an operation or operations to be performed on the pin. On completion of the work operations the pin is withdrawn from the work station and returned to its position 7 on the profiled rollers 1.

Figure 2C:
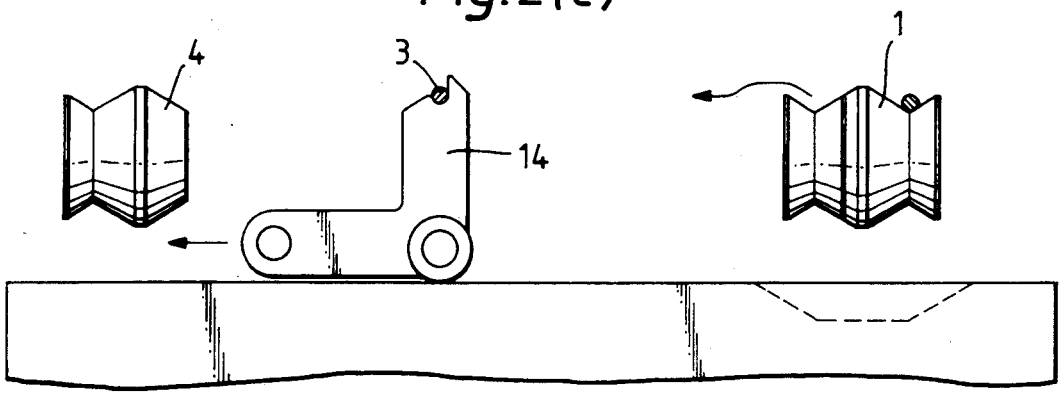
Figure 2D:
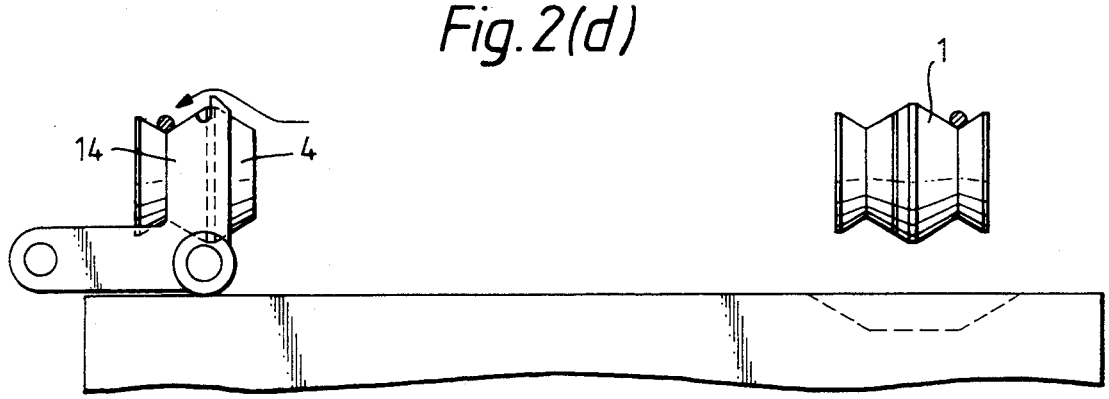
Figure 2E:
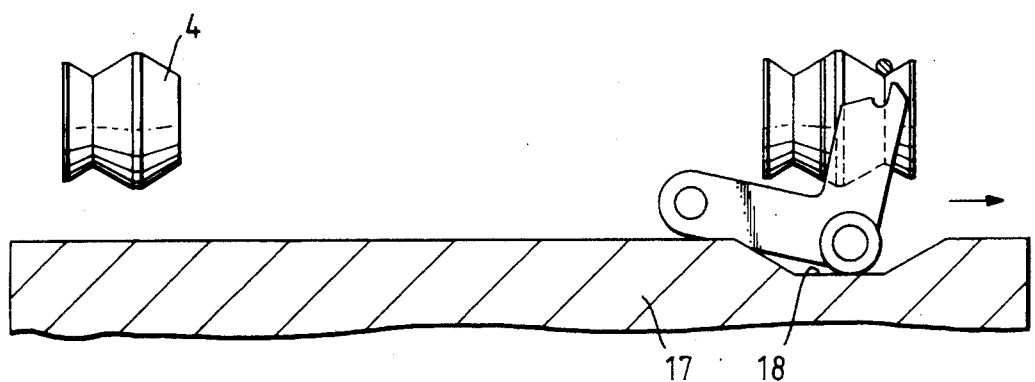
Figure 2F:
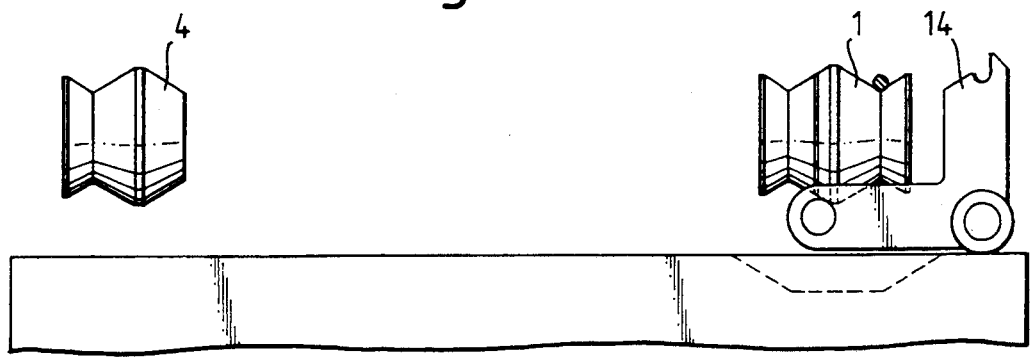

Thereafter, the cylinders 10 are re-actuated to continue the transverse displacement of the pin 3. With reference to FIGS. 2b and 2c, the pin 3 is lifted out of the groove 7 by the fingers 14 and the arrangement is such that during this operation the pin 3 falls into and is supported in channel 20 in each finger 14. The pin 3 is carried to the profiled rollers 4 at which the pin is lifted out of the channels 20 and deposited in the grooves 8 at the exit position as shown in FIG. 2d. In moving from the position in FIG. 2a the rollers 15, $15^1$ run along the upper surfaces of the guides 17 avoiding the cam profiles 18, $18^1$. Finally at the end of the traversing movement outlined above the roller $16^1$ contacts associated cam profile $19^1$ to axially displace the shaft 13 and the fingers 14. The axial displacement is such as to bring the rollers 15, $15^1$ in alignment with the cam profiles 18, $18^1$ in the guides 17 for the return transverse movement of the fingers and shown in FIGS. 2e and 2f. As a result, the fingers 14 can pass beneath a further pin 3 deposited in the grooves 6 at the pin entry position as shown in FIG. 2e. At the end of the return transverse travel the roller 16 cooperates with associated cam profile 19 whereby to axially displace the shaft 13 to its initial position (FIG. 2f). The cycle of operation can then be repeated.

The rodless pneumatic cylinders 10 are examples only of possible drive mechanisms for effecting transverse pin movements.

The illustrated embodiment shows a handling apparatus having three transversely separated positions 6, 7 and 8. A simpler form of construction could omit one of these positions. Thus the pin entry and work stations can be combined to form a single station. In such an arrangement a pin could not be introduced into the first position until a preceding pin cleared the work station and moved out of the first position. The three position apparatus has the advantage of providing a parking facility for a pin at the entry position while a preceding pin is at the work station position.

We claim:

1. Apparatus for handling axially elongate articles comprising aligned, profiled rollers forming at least two substantially parallel, transversely spaced apart axial travel paths for the articles and displacement means for moving the articles transversely between the paths, in which the displacement means comprises fingers secured on a shaft for rotational movements and a drive mechanism for displacing the shaft transversely to the axial travel paths of the articles.

2. Apparatus for handling axially elongate articles comprising aligned, profiled rollers forming at least two substantially parallel, transversely spaced apart axial travel paths for the articles and displacement means for moving the articles transversely between the paths, in which the displacement means comprises fingers secured on a shaft for axial and rotational movements and a drive mechanism for displacing the shaft transversely to the axial travel paths of the articles.

3. Apparatus according to claim 2 including a cross-beam for supporting the shaft, the drive mechanism being coupled to the cross-beam.

4. Apparatus according to claim 3 in which the drive mechanism comprises rodless pneumatic cylinders.

5. Apparatus according to claim 3 including cam rollers on the fingers cooperable with cam profiles associated with support means for the cross-beam to effect the axial and rotational movements.

6. Apparatus according to claim 2 including three spaced apart travel paths.

7. Apparatus for handling axially elongate articles comprising aligned, profiled rollers forming at least two substantially parallel, transversely spaced apart axial travel paths for the articles and displacement means movable along a substantially rectilinear transverse path for lifting the articles from one set of aligned profiled rollers, moving the articles transversely between the axial travel paths, and depositing the articles in another set of aligned profiled rollers.

8. Apparatus as claimed in claim 7 in which the displacement means comprises fingers mounted for axial and rotational movements along and about a common axis, and drive means for displacing the common axis transversely to the axial travel paths of the articles.

* * * * *